SMITH & HALL.
Steam-Cooking Apparatus.

No. 80,881.                                   Patented Aug 11, 1868.

Witnesses
Albert R. Swett
J. R. Hopkins

Inventors.
Julius Smith,
Isaac E. Hall.
by Prindle & Co.

UNITED STATES PATENT OFFICE.

JULIUS SMITH AND ISAAC E. HALL, OF LOGAN, OHIO.

IMPROVEMENT IN COOKING UTENSILS.

Specification forming part of Letters Patent No. 80,881, dated August 11, 1868.

*To all whom it may concern:*

Be it known that we, JULIUS SMITH and ISAAC E. HALL, of Logan, in the county of Hocking, and in the State of Ohio, have invented an Improved Steam-Cooking and Baking Utensil; and do hereby declare that the following is a full, clear, and exact description thereof, reference being had to the accompanying drawings, making a part of this specification, in which—

Letters of like name refer to like parts in each of the figures.

Figure 1:
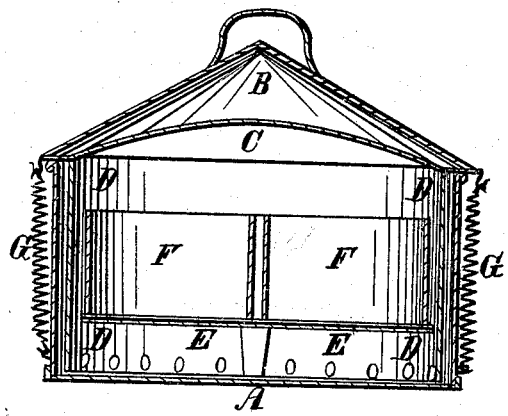
Figure 1 is a sectional elevation.
Figure 2:
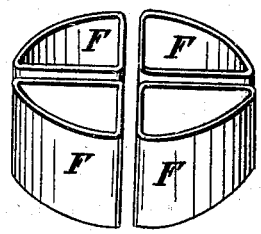
Figure 2 shows one form of vessels for holding the articles to be cooked.
Figure 3:
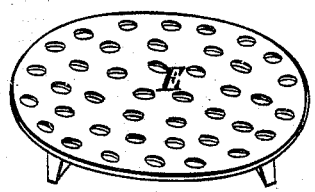
Figure 3 shows a stand used for raising the vessels above the water.

The nature of our invention consists in providing, for a culinary steamer, a suitable reservoir for containing water, with a double cover and an inside shell, by means of which the condensing of the steam is in a great measure prevented; in securing said cover to the reservoir by springs, so that it may rise and allow the steam to escape when the pressure becomes too great; and in providing a suitable stand for supporting the vessels containing articles being cooked, as is fully described below.

A represents a reservoir or vessel of equal size at both top and bottom.

B is a cover, with a lining, C, to the under side of which is attached a shell, D, smaller in diameter than the reservoir A, leaving between them a space of one-fourth of an inch. The shell extends to the bottom of the vessel, and has a number of holes near its lower edge.

E is a stand, formed of a circular plate of perforated metal, resting upon three legs. It is sufficiently small to allow the shell D to pass over it.

F represents one form of vessel for holding the articles to be cooked, which are supported by the stand E. They can be of any form, and either open or close, as may be desired.

The whole cooking-apparatus can be made of tin, copper, or any metal deemed best.

Attached to the sides of the reservoir A are spiral springs G, which are connected with the cover by hooks, allowing them to be readily removed.

This apparatus can be used for either roasting, baking, or steaming articles of food, and is operated as follows, viz:

Boiling water is poured into the reservoir until it nearly reaches the top of the stand upon which the articles to be cooked are placed in suitable vessels, the cover put on and secured by the springs, and the water caused to boil by setting it upon the top of a stove, or in any other way deemed most desirable. The steam generated being confined within the casing, rapidly cooks the articles by its moisture, or, if the vessels are tightly covered, by heat. In case the pressure of steam becomes too great, the springs allow the cover to rise until the holes near the bottom of the casing are brought above the surface of the water, allowing the steam to escape through the space between the casing and reservoir, when the cover returns to its place.

The advantages possessed by the method of cooking by steam are so obvious as to render comment unnecessary, and we shall only notice those features peculiar to this apparatus, in which it is claimed to be superior to all others intended for a like purpose.

First, the spaces between the cover and lining and between the casing and reservoir protect the apparatus from the cool air, so as to almost entirely prevent the condensation of the steam.

Second, by confining the covers by means of the springs, all danger from too great pressure of steam is avoided.

Third, it is simple in construction, not liable to get out of order, and can be produced at a small cost.

Having thus fully set forth the nature and merits of our improvement, what we claim as our invention, and desire to secure by Letters Patent, is—

Confining the lid of a steamer by means of spiral springs, whereby all danger from excessive pressure of steam is avoided, substantially as herein set forth.

We also claim the cooking-apparatus, composed of the reservoir A, cover B, lining C, shell D, stand E, vessels F, and springs G, when constructed in the manner and for the purpose substantially as herein specified.

In testimony that we claim the foregoing, we have hereunto set our hands, this 30th day of April, 1868.

JULIUS SMITH,
ISAAC E. HALL.

Witnesses:
G. W. ALFRED,
W. HOUSTON.